Patented Nov. 8, 1927.

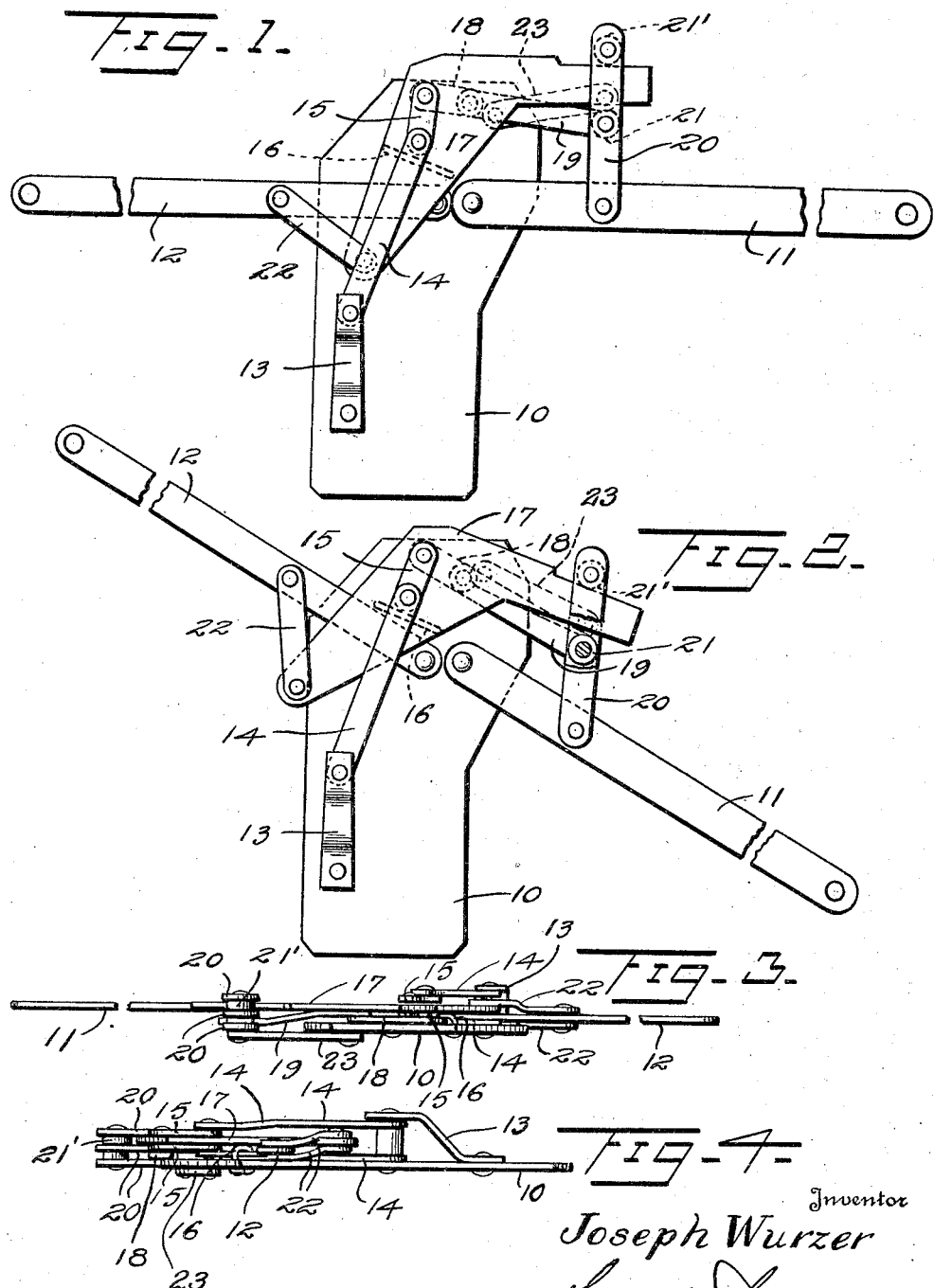

1,648,098

UNITED STATES PATENT OFFICE.

JOSEPH WURZER, OF DEDHAM, IOWA.

DRAFT EQUALIZER.

Application filed December 11, 1925. Serial No. 74,778.

This invention relates to new and useful improvements in draft equalizers, and particularly to draft equalizers for use in connection with agricultural machines, such as plows.

One object of the invention is to provide a device of this character by means of which side draft is practically eliminated, and the pull of the horses on the land side is equalized with relation to the pull of the horses in the furrow.

Another object is to provide a device of this character which is simple in construction and durable in operation, and which is formed of few and simple parts.

Other objects and advantages will be apparent from the following description when taken in connection with the accompanying drawing.

In the drawing:

Figure 1 is a plan view of a draft equalizer made in accordance with the present invention, and in normal position.

Figure 2 is a plan view of the invention, showing the position of the parts when turning to the right.

Figure 3 is an end view, of Figure 1.

Figure 4 is a side view, of Figure 1.

Referring particularly to the accompanying drawing, 10 represents a suitable frame which is secured to a plow at one end. Pivotally connected to the intermediate portion of the frame, and extending laterally from opposite sides thereof, are the draft beams 11 and 12. Secured to one face of the frame 10, adjacent the rear end and one side thereof, is an offset bracket 13, and pivotally connected to this bracket, and to the frame, are the parallel links 14, said links extending obliquely and longitudinally of the frame, and have the short links 15 pivotally connected to their other ends. A guide 16, carried by the frame 10, receives the adjacent link 14 slidably therethrough, and maintains said link in close relation to the frame. The other ends of the short links 15 are pivotally connected to the opposite sides of the angle portion of an angle lever 17, and also connected to this last-named pivot is one end of a short link 18. Pivotally connected to the other end of the link 18 is a longer link 19, which extends laterally from the side of the frame and pivotally connects with the parallel links 20 which are pivotally carried by the longer lever or beam 11, and which extend forward in normal parallel relation to the side of the frame. One arm of the angle lever 17 is slidably disposed between the links 20, and plays between the roller 21 on the pivot of the links 19 and 20, and roller 21' between the outer ends of links 20. Pivotally connected to the extremity of the other arm of the angle lever 17, and to the draft beam 12, are the links 22. Pivotally connected to one of the links 20, and to the support 10, is a link 23, which serves to maintain the links 20 and the angle lever 17 in the same relation to each other.

Two horses are adapted to be hitched to each of the draft beams 11 and 12, and as the two horses of the beam 12 pull a degree stronger than those of the beam 11, the links 22 will cause the lever 17 to be rocked, and its lateral arm to engage with the pivot of the link 19, whereupon said arm will push rearwardly on the links 20, and swing the beam 11 rearwardly, thus holding back the horses of the beam 11.

Thus the horses on the unplowed land cannot overbalance the pull of the horses in the plowed land, but produce an equalized draft on both sides of the device, with the result that the plow will not be pulled more on one side than on the other.

While I have shown the device as applied to a four horse team, I wish it understood that five horses may be hitched to the device, by hitching three of the horses to the lever on the furrow side, and two horses on the land side. In this event it becomes necessary to lengthen the beam on the unplowed land side.

What is claimed is:

1. A draft equalizer including a support, oppositely extending draft beams movably connected to the support, an angle lever movably connected with the support, means on one of said beams slidingly guiding one end of said angle lever, connections between the guiding means and the angle lever, and connections between the other beam and the angle lever.

2. A draft equalizer including a support, draft beams pivotally mounted on the support and extending from opposite sides thereof, links movably carried by one of the beams and extending at right angles thereto, an angle lever pivotally connected with the support and having one arm slidably disposed between said links, links pivotally connected to the other end of the angle lever and to the other draft beam, and connections between the first links and the angle lever.

3. A draft equalizer including a support, draft beams pivotally mounted on the support and extending from opposite sides thereof, links movably carried by one of the beams and extending at right angles thereto, an angle lever having one arm slidably disposed between said links, links pivotally connected to the other end of the angle lever and to the other draft beam, links pivotally connected to the first links and to the angle lever, and links connected to the angle lever and to the support.

In testimony whereof, I affix my signature.

JOSEPH WURZER.